US009485488B2

(12) United States Patent
Li

(10) Patent No.: US 9,485,488 B2
(45) Date of Patent: *Nov. 1, 2016

(54) THREE-DIMENSIONAL DISPLAY METHOD AND THREE-DIMENSIONAL DISPLAY DEVICE

(71) Applicant: SUPERD CO. LTD, Shenzhen, Guangdong (CN)

(72) Inventor: Dongfang Li, Guangdong (CN)

(73) Assignee: SUPERD CO. LTD, Shenzhen, Guangdong (CN)

( * ) Notice: Subject to any disclaimer, the term of this patent is extended or adjusted under 35 U.S.C. 154(b) by 137 days.

This patent is subject to a terminal disclaimer.

(21) Appl. No.: 14/493,377

(22) Filed: Sep. 23, 2014

(65) Prior Publication Data

US 2015/0195504 A1  Jul. 9, 2015

(30) Foreign Application Priority Data

Jan. 8, 2014  (CN) .......................... 2014 1 0009291

(51) Int. Cl.
| | |
|---|---|
| *G06T 15/00* | (2011.01) |
| *H04N 13/00* | (2006.01) |
| *H04N 13/04* | (2006.01) |
| *G06T 19/00* | (2011.01) |
| *G06T 17/00* | (2006.01) |
| *G06T 15/10* | (2011.01) |
| *G06T 17/20* | (2006.01) |

(52) U.S. Cl.
CPC ...... *H04N 13/0018* (2013.01); *H04N 13/0404* (2013.01); *H04N 13/0409* (2013.01); *H04N 13/0415* (2013.01); *H04N 13/0425* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ....... G06T 19/00; G06T 17/20; G06T 17/00; G06T 15/10; G06T 15/00
See application file for complete search history.

(56) References Cited

U.S. PATENT DOCUMENTS

| | | | |
|---|---|---|---|
| 8,368,690 B1 * | 2/2013 | Hoppenstein ...... | H04N 13/0413 345/419 |
| 9,055,286 B2 * | 6/2015 | Song ................. | H04N 13/0402 |
| 2009/0153652 A1 * | 6/2009 | Barenbrug ......... | H04N 13/0018 348/54 |

(Continued)

FOREIGN PATENT DOCUMENTS

| | | |
|---|---|---|
| CN | 102724545 A | 10/2012 |
| CN | 102928986 A | 2/2013 |
| CN | 201310136018 | 9/2013 |

OTHER PUBLICATIONS

Search Report, CN.
Search Repport, CN.

*Primary Examiner* — Abderrahim Merouan
(74) *Attorney, Agent, or Firm* — Andrew C. Cheng

(57) ABSTRACT

The present invention provides a 3D display method, which comprises: obtaining an interference value of a display unit displaying at least one pair of images with parallax under the coverage of a spectroscopic device; adjusting the display unit based on the interference value; and the adjusted display unit displaying the at least one pair of images with parallax. The present invention also provides a 3D display device. Through the technical solution of the present invention, the crosstalk phenomenon during the 3D display process can be relieved to optimize the 3D display result.

17 Claims, 5 Drawing Sheets

(56) References Cited

U.S. PATENT DOCUMENTS

| | | | | |
|---|---|---|---|---|
| 2009/0167639 A1* | 7/2009 | Casner | | G02B 27/2214 345/58 |
| 2011/0241983 A1* | 10/2011 | Chang | | G09G 3/3648 345/156 |
| 2012/0092763 A1* | 4/2012 | Song | | G02B 27/2214 359/463 |
| 2012/0176485 A1* | 7/2012 | Miyauchi | | G02B 27/2264 348/56 |
| 2012/0182611 A1* | 7/2012 | Fukushima | | G02B 27/2214 359/462 |
| 2013/0033583 A1* | 2/2013 | Lee | | H04N 13/0409 348/47 |
| 2013/0321596 A1* | 12/2013 | Li | | H04N 13/0497 348/51 |
| 2014/0035907 A1* | 2/2014 | Hasewaga | | G09G 5/14 345/419 |
| 2014/0063015 A1* | 3/2014 | Cho | | G02B 27/2214 345/426 |
| 2014/0313296 A1* | 10/2014 | Song | | H04N 13/0402 348/54 |

* cited by examiner

THREE-DIMENSIONAL DISPLAY METHOD AND THREE-DIMENSIONAL DISPLAY DEVICE

BACKGROUND OF THE INVENTION

1. Field of the Invention

The present invention relates to the field of three-dimensional (3D) displaying techniques, and in particular to a three-dimensional display method and three-dimensional display device.

2. The Related Arts

In the process of the three-dimensional (3D) displaying, the display needs to provide the left-eye and right-eye images to the left eye and right eye, respectively. Due to several reasons, the left eye of the viewer may see a certain amount of the contents of the right-eye image and the right eye of the viewer may see a certain amount of the contents of the left-eye image, which leads to a phenomenon called crosstalk (or ghost) in 3D scenes. The presence of crosstalk greatly influences the quality of the 3D display.

Therefore, how to reduce the presence of 3D display crosstalk becomes an important technical problem to be addressed.

SUMMARY OF THE INVENTION

The present invention is to address the aforementioned issues in the known techniques. To solve the aforementioned problems in known technique, an object of the present invention is to provide a 3D display method.

Another object of the present invention is to provide a 3D display device.

To achieve the above objects, the present invention provides a 3D display method, which includes: obtaining an interference value of a display unit displaying at least one pair of images with parallax under the coverage of a spectroscopic device; adjusting the display unit display unit based on the interference value; and the adjusted display unit displaying the at least one pair of images with parallax.

In the instant technical solution, the interference value includes the total amount of crosstalk generated mutual by the at least one pair of images with parallax or by many images with parallax. By adjusting the display unit based on the interference value, the adjusted display unit can reduce the interference value, that is, reduce the corresponding total amount of crosstalk generated mutual by the at least one pair of images with parallax, so as to optimize the 3D display result.

In addition, according to a preferred embodiment of the present invention, the 3D display method further includes the following technical feature:

According to a preferred embodiment of the present invention, the step of obtaining the interference value specifically includes: based on the display area ratios corresponding to the at least one pair of images with parallax displaying on the display unit, and respective difference between display values of the display unit and display values of the at least one pair of images with parallax, obtaining the interference value.

In the instant technical solution, since the display area ratio is related to the affected extent, such as, a more strongly affected extent for a larger display area ratio, a corresponding affected extent can be identified by obtaining the display area ratio so as to adjust the display unit based on the affected extent to display the optimized display values when displaying pixel images. In other words, the interference value from the left-eye image and the right-eye image is reduced to decrease the crosstalk effect.

Through obtaining simultaneously the display area ratio corresponding to the left-eye image and right-eye image, the effect on the left-eye image and right-eye image can be understood; and when adjusting the optimized display values based on the effect, the left-eye image and right-eye image can both be considered to avoid adjusting the left-eye image and right-eye image inconsistently, which may result in an inconsistent viewing for both eyes.

In the mean time, because the display unit can only display certain fixed values, therefore, the interference value identified through the respective difference between the display values of the display unit and the left-eye image and right-eye image can both consider the effect of the actual display values of the display unit on the left-eye image and the right-eye image so as to make the final display effect more reasonable and balanced.

According to a preferred embodiment of the present invention, the step of obtaining the display area ratios specifically includes: based on a structural attribute of the 3D display device of the display unit and/or location information of a viewer, identifying display areas on the display unit corresponding to the at least one pair of images with parallax respectively; and calculating the respective ratios between the display area on the display unit corresponding to the at least one pair of images with parallax and the total display area.

In the instant technical solution, the structure attribute is fixed after the 3D display device is manufactured. Therefore, the display area ratios can be known according to the actual structure feature of the 3D display device. Also, when eyeball tracking technique is used in display technology, the different location information of a viewer or viewers can also lead to changes in the display area of the display unit corresponding to the left-eye image and the right-eye image. Therefore, obtaining the location information can also be used to reduce the crosstalk level when using eyeball tracking.

Wherein, without considering eyeball tracking, the ratio between the display area and corresponding display area can be calculated solely based on the structure attribute of the 3D display device. Similarly, when all the parameters of the structure features are fixed, the ratio between the display area and corresponding display area can be calculated solely based on the location information of eyeball tracking. Through simultaneously obtaining the structure attribute and location information, both hardware features and eyeball tracking technique can be considered to realize the reduction of crosstalk.

Preferably, the structure attribute includes at least one or any combination of the following: a tilt angle between the display panel of the 3D display device and the spectroscopic device, an aperture ratio of the spectroscopic device, location information of the display unit at the spectroscopic device, parallaxes of the display content of the display unit and the size of the display unit.

In the instant technical solution, if the spectroscopic device and the display panel are not disposed with an in-between tilt angle, the tilt angle can be considered as 0°. However, a non-zero tilt angle must be considered when the disposition between the spectroscopic device and the display panel is in a tilt manner or an error may exist. Also, when lens grating is used, the lens grating may be considered as equivalent to a slit grating with an aperture ratio of 100%.

Of course, for those with ordinary skill in this field, any one or more items from the above structure attribute can be used, as well as, other structure attributed not mentioned above. When more types of structure attributes are used, a more accurate computation can be resulted. On the other hand, when less attributes are used, the computation load is reduced.

According to a preferred embodiment of the present invention, the step of adjusting the display unit based on the interference value includes: for the at least one pair of images with parallax, identifying a first weight of a first crosstalk amount in the left-eye image caused by the right-eye image on the left-eye image, and a second weight of a second crosstalk amount in the right-eye image caused by the left-eye image on the right-eye image; based on the first weight, the second weight, the display value of the left-eye image and the display value of the right-eye image, generating a calculation equation of the interference value regarding the display value of the separate display unit; when the calculation equation having a minimum interference value and the optimized display value of the display unit being between the display value of the left-eye image and the display value of the right-eye image, the optimized display value of the display unit being obtained.

In the instant technical solution, when generating the calculation equation of the interference value, the use of weight embodies the effects on the left-eye image and the right-eye image. Therefore, when the optimized display value is computed based on the equation, the adjustment on the crosstalk amount on the left-eye image and the right-eye image can be reflected, i.e., reducing crosstalk effect.

Preferably, the display area ratio corresponding to the left-eye image is proportional to the first weight and the display area ratio corresponding to the right-eye image is proportional to the second weight. In the instant technical solution, the crosstalk effect is stronger when the display area ratio is higher. Therefore, by making the display area ratio proportional to the weight, the more adjustment is performed on the side with the higher weight so that the display effect of the left-eye image and the right-eye image is balanced while reducing the crosstalk effect.

Specifically, an embodiment could use the display area ratio corresponding to the left-eye image as the first weight, and the display area ratio corresponding to the right-eye image as the second weight.

In the instant technical solution, the display area ratios can be directly used as a corresponding weight. Alternatively, other parameters proportional to the display area ratios can also be used to realize the crosstalk adjustment on the left-eye and right-eye images.

According to a preferred embodiment of the present invention, the method further includes: based on the difference between the first crosstalk amount and the second crosstalk amount, adjusting the calculational equation of the interference value to balance the first crosstalk amount and the second crosstalk amount; and based on the adjusted calculation equation of the interference value, obtaining the optimized display value of the display unit.

In the instant technical solution, not only the interference value must be minimized, the difference between the first crosstalk amount and the second crosstalk amount is also considered through the adjustment on the calculation equation of the interference value so that the respective crosstalk amount corresponding to left-eye image and the right-eye image is more balanced and reasonable when displaying with the adjusted display values, which makes the left-eye image and the right-eye image more coordinated to improve viewing comfortably.

Preferably, the step of adjusting interference value includes: adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

Another embodiment of the present invention provides a 3D display device, which includes: an obtaining unit, for obtaining an interference value of a display unit displaying at least one pair of images with parallax under the coverage of a spectroscopic device; an adjustment unit, for adjusting the display unit based on the interference value; and a display unit, after adjustment for displaying the at least one pair of images with parallax.

In the instant technical solution, the interference value includes the total amount of crosstalk generated mutual by the at least one pair of images with parallax. By adjusting the display unit based on the interference value, the adjusted display unit can reduce the interference value, that is, reduce the corresponding total amount of crosstalk generated mutual by the at least one pair of images with parallax, so as to optimize the 3D display result.

In addition, according to a preferred embodiment of the present invention, the 3D display method further includes the following technical feature:

According to a preferred embodiment of the present invention, the obtaining unit further includes: a ratio obtaining module, for obtaining the display area ratios corresponding to for the at least one pair of images with parallax displaying on the display unit; a difference obtaining module, for obtaining the respective difference between display values of the display unit and display values of the at least one pair of images with parallax; an interference value identifying module, for obtaining the interference value based on the display area ratios corresponding to the at least one pair of images with parallax displaying on the display unit, and respective difference between display values of the display unit and display values of the at least one pair of images with parallax.

In the instant technical solution, since the display area ratio is related to the affected extent, such as, a more strongly affected extent for a larger display area ratio, a corresponding affected extent can be identified by obtaining the display area ratios so as to adjust the display unit based on the affected extent to display the optimized display values when displaying pixel images. In other words, the interference value from the left-eye image and the right-eye image is reduced to decrease the crosstalk effect.

Through obtaining simultaneously the display area ratio corresponding to the left-eye image and right-eye image, the effect on the left-eye image and right-eye image can be understood; and when adjusting the optimized display values based on the effect, the left-eye image and right-eye image can both be considered to avoid adjusting the left-eye image and right-eye image inconsistently, which may result in an inconsistent viewing for both eyes.

In the mean time, because the display unit can only display certain fixed values, therefore, the interference value identified through the respective difference between the display values of the display unit and the left-eye image and right-eye image can both consider the effect of the actual display values of the display unit on the left-eye image and the right-eye image so as to make the final display effect more reasonable and balanced.

According to a preferred embodiment of the present invention, the ratio obtaining module includes: an area identifying sub-module, for identifying display area on the display unit corresponding to the at least one pair of images with parallax respectively based on a structural attribute of the 3D display device of the display unit and/or location information of a viewer or viewers; and a ratio calculating sub-module, for calculating the respective ratio between the display area on the display unit corresponding to the at least one pair of images with parallax and the total display area.

In the instant technical solution, the structure attribute is fixed after the 3D display device is manufactured. Therefore, the display area ratios can be known according to the actual structure feature of the 3D display device. Also, when eyeball tracking technique is used in display technology, the different location information of a viewer or viewers can also lead to changes in the display area of the display unit corresponding to the left-eye image and the right-eye image. Therefore, obtaining the location information can also be used to reduce the crosstalk level when using eyeball tracking.

Wherein, without considering eyeball tracking, the ratio between the display area and corresponding display area can be computed solely based on the structure attribute of the 3D display device. Similarly, when all the parameters of the structure features are fixed, the ratio between the display area and corresponding display area can be computed solely based on the location information of eyeball tracking. Through simultaneously obtaining the structure attribute and location information, both hardware features and eyeball tracking technique can be considered to realize the reduction of crosstalk.

Preferably, the structure attribute includes at least one or any combination of the following: a tilt angle between the display panel of the 3D display device and the spectroscopic device, an aperture ratio of the spectroscopic device, location information of the display unit at the spectroscopic device, parallaxes of the display content of the display unit and the size of the display unit.

In the instant technical solution, if the spectroscopic device and the display panel are not disposed with an in-between tilt angle, the tilt angle can be considered as 0°. However, a non-zero tilt angle must be considered when the disposition between the spectroscopic device and the display panel is in a tilt manner and an error may exist. Also, when lens grating is used, the lens grating may be considered as equivalent to a slit grating with an aperture ratio of 100%.

Of course, for those with ordinary skill in this field, any one or more items from the above structure attribute can be used, as well as, other structure attributed not mentioned above. When more types of structure attributes are used, a more accurate computation can be resulted. On the other hand, when less attributes are used, the computation load is reduced.

According to a preferred embodiment of the present invention, the adjustment unit includes: a weight indentifying module, for the at least one pair of images with parallax, identifying a first weight of a first crosstalk amount in the left-eye image caused by the right-eye image on the left-eye image, and a second weight of a second crosstalk amount in the right-eye image caused by the left-eye image on the right-eye image; a calculation equation generating module, for, based on the first weight, the second weight, the display value of the left-eye image and the display value of the right-eye image, generating a calculation equation of the interference value regarding the display value of the display unit; a value identifying module, when the calculation equation having a minimum interference value and the optimized display value of the display unit being between the display value of the left-eye image and the display value of the right-eye image, for obtaining the optimized display value of the display unit.

In the instant technical solution, when generating the calculation equation of the interference value, the use of weight embodies the effects on the left-eye image and the right-eye image. Therefore, when the optimized display value is computed based on the equation, the adjustment on the crosstalk amount on the left-eye image and the right-eye image can be reflected, i.e., reducing crosstalk effect.

Preferably, the display area ratio corresponding to the left-eye image is proportional to the first weight and the display area ratio corresponding to the right-eye image is proportional to the second weight. In the instant technical solution, the crosstalk effect is stronger when the display area ratio is higher. Therefore, by making the display area ratios proportional to the weight, the more adjustment is performed on the side with the higher weight so that the display effect of the left-eye image and the right-eye image is balanced while reducing the crosstalk effect.

Specifically, an embodiment could use the display area ratio corresponding to the left-eye image as the first weight, and the display area ratio corresponding to the right-eye image as the second weight.

In the instant technical solution, the display area ratios can be directly used as a corresponding weight. Alternatively, other parameters proportional to the display area ratios can also be used realize the crosstalk adjustment on the left-eye and right-eye images.

According to a preferred embodiment of the present invention, the device further includes: a balance unit, based on the difference between the first crosstalk amount and the second crosstalk amount, for adjusting the calculational equation of the interference value to balance the first crosstalk amount and the second crosstalk amount; wherein the value identifying module obtaining the optimized display value of the display unit based on the adjusted calculation equation of the interference value.

In the instant technical solution, not only the interference value must be minimized, the difference between the first crosstalk amount and the second crosstalk amount is also considered through the adjustment on the calculation equation of the interference value so that the respective crosstalk amount corresponding to left-eye image and the right-eye image is more balanced and reasonable when displaying with the adjusted display values, which makes the left-eye image and the right-eye image more coordinated to improve viewing experience.

Preferably, the balance unit includes: a parameter adding module, for adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

Through the above technical solutions, the crosstalk effect in the 3D displaying process can be effectively reduced to improve 3D displaying result.

The foregoing will become better understood from a careful reading of a detailed description provided herein below with appropriate reference to the accompanying drawings.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To clearly describe the objects, features and advantages, the following refers drawings and embodiments. It should be noted that, the features in the embodiments can be mutually combined when not conflicting.

The following describes details for thorough understanding of the present invention. However, the present invention may also be embodied in other means not described in the disclosure. Therefore, the scope of the present invention is not restricted by the disclosed embodiments.

Specifically, in naked eye 3D displaying process, the crosstalk includes the inherent crosstalk of spectroscopic device, and the inherent crosstalk of display device. For explanation, the following description uses a grating as a spectroscopic device and a display panel as display device.

Figure 1:
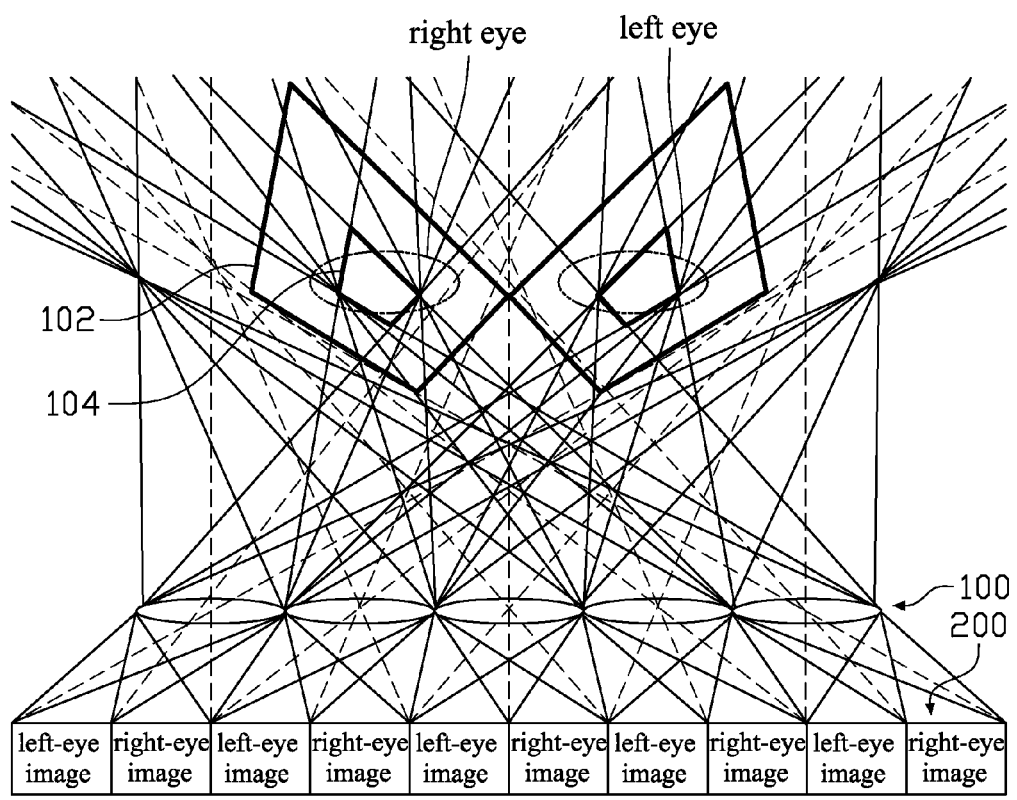
FIG. 1 and FIG. 2 are schematic views showing the formation of crosstalk in 3D display device.

As shown in FIG. 1, a lens grating is used as a spectroscopic device 100. Considering the quality of the material used in the spectroscopic device 100 or the manufacturing error, a left image information and a right image information on a display device 200 is impossible to be completely split; that is, the left image information displayed on the display device 200 is completely projected to the left eye, and the right image information is completely projected to the right eye. Therefore, an inevitable crosstalk occurs. This is called the inherent crosstalk of spectroscopic device. Use the right eye as example. A large amount of rays corresponding to the left-eye image exists in the view field area 102 in FIG. 1, i.e., crosstalk. In comparison, the rays in view field 104 is relatively un-interfered.

Figure 2:
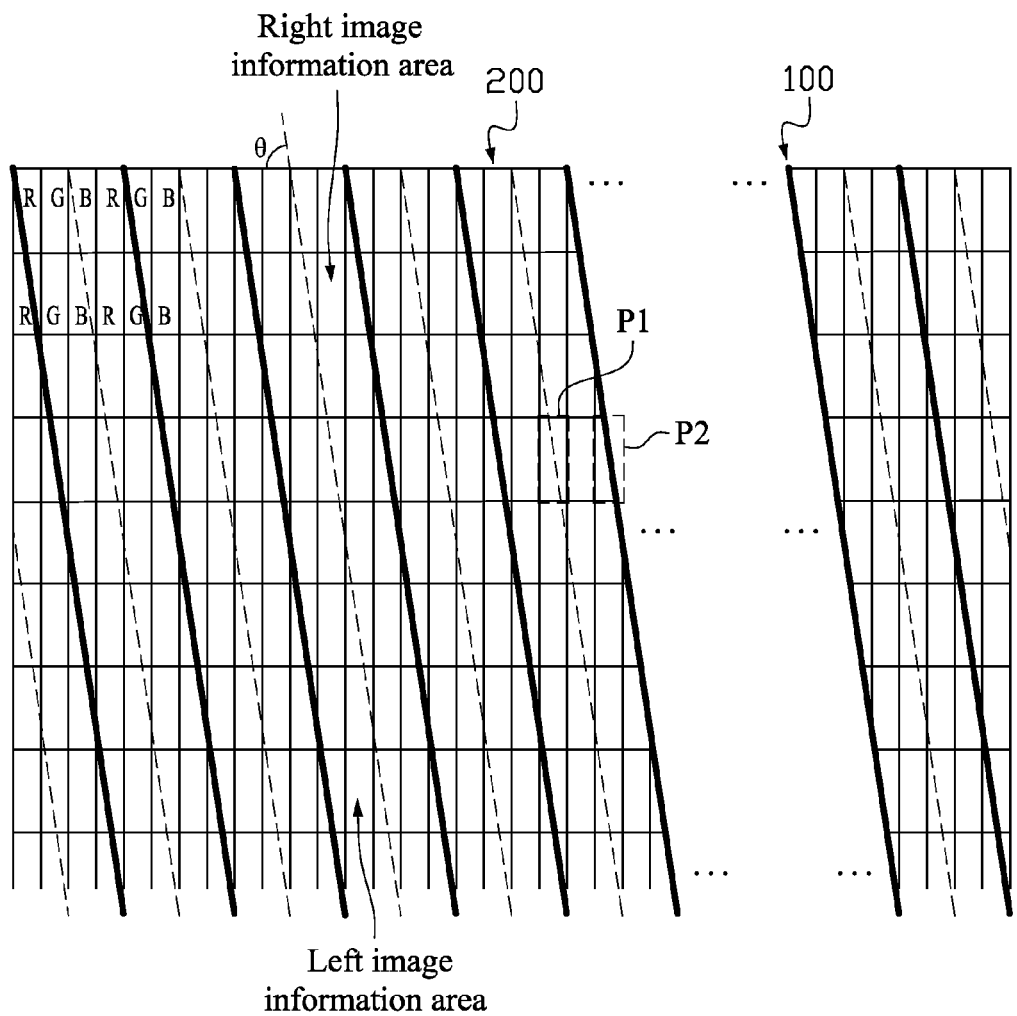

In addition, because the horizontal misalignment or tilt may occur when attaching the spectroscopic device 100 to the display device 200, in actual application, the spectroscopic device 100 and the display device 200 are intentionally disposed in relative tilt position in order to reduce the Morie pattern. As shown in FIG. 2, a slit grating is used as spectroscopic device 100, and the slit grating is projected onto a display panel (i.e., the display device 200) according to the viewing of human eye. The broad line has a horizontal width w, which is the horizontal light-blocking width. The horizontal gap between the centers of two adjacent broad lines is the pitch of arranging the left image information and the right image information in a display unit which appears on the display panel, and $\delta=(1-w)/pitch$ is the light-transmittance ratio or the aperture ratio of the slit grating. Let the tilt angle between the slit grating and the display panel be $\theta$, and some display unit, such as pixels P1 and P2, on the display panel will have a part in the left image information area (the display panel area seen by the left eye through the grating) and a part in the right image information area (the display panel area seen by the right eye through the grating), as well as a part shaded by the slit grating and not appearing in neither left nor right image information area. It should be noted that when a lens grating is used, the aperture ratio $\delta$ in FIG. 2 can be directly defined as 100%, that is, the horizontal width w of the broad line w=0, which approximates the effect of using lens grating as the spectroscopic device 100.

In actual application, the display unit P1 and P2 as an entity can ultimately only display a fixed color or brightness. Therefore, no matter how P1 and P2 display, as long as there exists difference of the left and right image information (i.e., specifically, the color, brightness) in the display unit, the crosstalk must occur, i.e., the inherent crosstalk of display device.

In practice, even when the display device 200 and the spectroscopic device 100 are placed vertically, due to a relative misalignment in attachment display unit appear periodically, which is similar to display unit P1 and P2, i.e., comprising the pixel values of left and right image area simultaneously.

Figure 3:
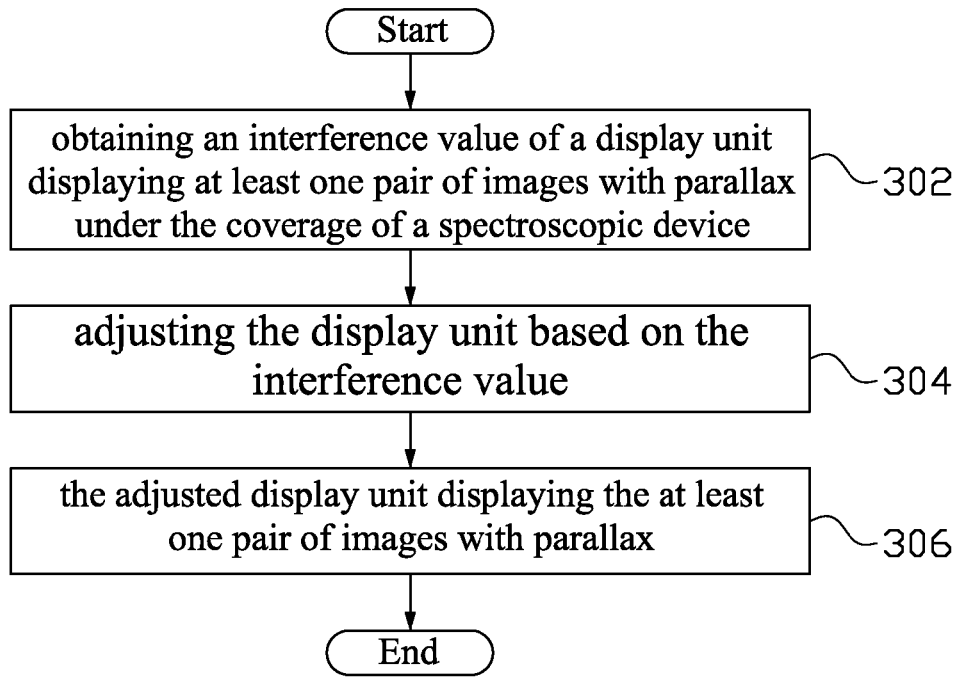
FIG. 3 is a flowchart showing a 3D display method according to an embodiment of the present invention.

FIG. 3 is a flowchart showing a 3D display method according to an embodiment of the present invention. As shown in FIG. 3, the 3D display method comprises:

Step 302: obtaining an interference value of a display unit displaying at least one pair of images with parallax under the coverage of a spectroscopic device;

Step 304: adjusting the display unit based on the interference value; and

Step 306: the adjusted display unit displaying the at least one pair of images with parallax.

In the instant technical solution, the interference values comprise the total amount of crosstalk generated mutual by the at least one pair of images with parallax. Adjusting the display unit based on the interference value can effectively reduce the crosstalk phenomenon, that is, reduce the corresponding total amount of crosstalk generated mutual by the at least one pair of images with parallax, so as to optimize the 3D display result.

According to a preferred embodiment of the present invention, the step of obtaining the interference value specifically comprises: based on the display area ratios corresponding to the at least one of pair of images with parallax displaying on the display unit, and respective differences between display values of the display unit and display values of the at least one pair of images with parallax, obtaining the interference value.

In the instant technical solution, since the display area ratio is related to the affected extent of crosstalk, such as, a more strongly affected extent of crosstalk for a larger display area ratios, a corresponding affected extent of crosstalk can be identified by obtaining the display area ratios so as to adjust the display unit based on the affected extent of crosstalk to display the optimized display values when displaying pixel images. In other words, the interference value from the left-eye image and the right-eye image is reduced to decrease the crosstalk effect.

Through obtaining simultaneously the display area ratio corresponding to the left-eye image and right-eye image and obtaining the interference value of affecting 3D display result, the effect on the left-eye image and right-eye image can be understood; and when adjusting the optimized display values based on the effect, the left-eye image and right-eye image can both be considered to avoid adjusting the left-eye image and right-eye image inconsistently, which may result in an inconsistent viewing for both eyes.

Figure 4:
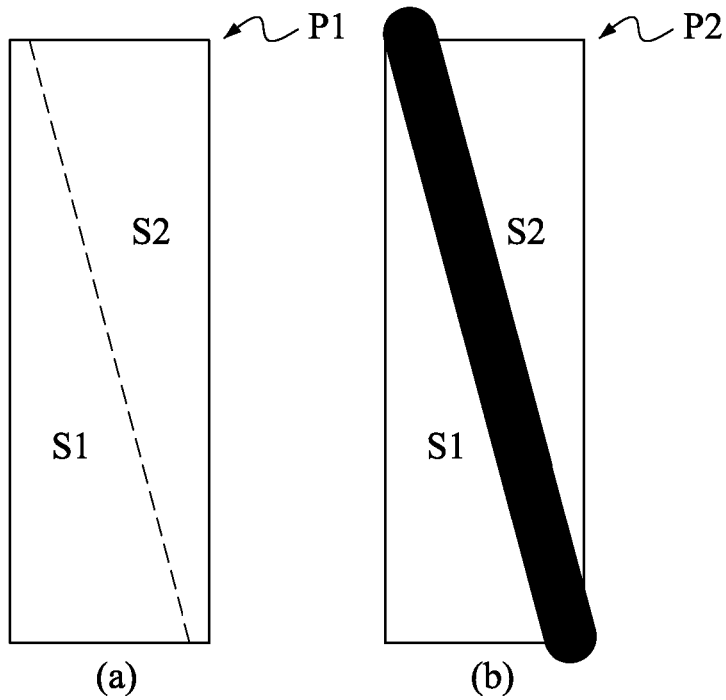
FIG. 4 is a schematic view showing a display unit according to an embodiment of the present invention.

Specifically, FIG. 4 is a schematic view showing a display unit according to an embodiment of the present invention.

Referring to FIG. 2 and FIG. 4, FIG. 4(a) shows a schematic view corresponding to the display unit P1 of FIG. 2, and FIG. 4(b) shows a schematic view corresponding to the display unit P2 of FIG. 2.

The display unit refers to a display structure unit as an entity. For example, in an RGB-based display panel, with considering brightness without the color difference, a sub-pixel can be a sub-pixel unit, which is an independent display unit able to display a brightness value. When the color difference is also considered, such as, a red sub-pixel being divided, a color shift will occur if the green component and the blue component of the main pixel where the pixel exists do not change. Therefore, it is necessary to treat the main pixel as an entity, i.e., a display unit entity. The value of the entity can be considered as the grayscale converted from RGB, indicating the entity brightness. There is also RGBW-based display panel. Specifically, display unit P1, p2 can be any unit areas on the display device 200 of FIG. 2, such as, some pixel set, main pixel or sub-pixel (the layout direction of the pixel can be lateral or vertical). For simplicity of description, the following uses sub-pixel as example.

In the mean time, the display value of the left-eye image, right-eye image and any display unit can be any parameter values able to show display result difference, such as pixel values, brightness values, and grayscale values. For description, the present invention uses display value to indicate specific parameter types and combines the RGB color space for explanation.

Both the display unit P1, p2 of FIGS. 4(a), 4(b) have a part in the left image information area (corresponding to left-eye image), a part in the right image information area (corresponding to right-eye image), and possible a part blocked by the slit grating, shown as the shielding on the display unit caused by the black slant lines in FIG. 4(b), which is neither in left image information nor in right image information. In actual application, pixel P1 or p2 of the display device can display only a fixed pixel value as an entity. As long as the pixel value is inconsistent with the left-eye image or the right-eye image, the crosstalk occurs, and a minimization problem exists. That is, the final display value of P1 or p2 must be minimized the whole crosstalk experienced in viewing.

Although the spectroscopic device 100 in FIG. 2 is a slit grating, the technical solution of the present invention is also applicable to lens grating. For a specific embodiment, the optical model corresponding to the lens grating can be simplified equivalently to the condition where the slit grating has an aperture ratio of δ=100%. That is, there exists no problem of shielding for pixels P1, P2, and the sum of the area ratio by left and right eyes is 100%.

For a more specific embodiment, the display area/display area ratio of the left-eye image and the right-eye image on the display unit can be considered as a weighted result (i.e., the contribution of each location of the display unit P1, p2 to the crosstalk is weighted). Specifically, when a line connecting a location on the display unit P1/P2 and the viewer's eye is close to the center of the lens of the lens grating, the weight of the crosstalk for the location is considered less. On the other hand, when a line connecting a location on the display unit P1/P2 and the viewer's eye is close to the border of two lenses, the weight of the crosstalk for the location is considered more.

Model Construction:

1. Initial Model:

In the instant technical solution of the present invention, the total amount of crosstalk must be controlled (i.e., the aforementioned interference value). For example, the crosstalk caused by the right-eye image on the left-eye image is defined as the left-eye crosstalk total amount; and the crosstalk caused by the left-eye image on the right-eye image is defined as the right-eye crosstalk total amount. Also, a control module can be added, for performing balancing during the crosstalk adjustment process. The balancing can be in several aspects.

For example, to prevent the final result from causing a large crosstalk difference between the left and right eyes and becoming asymmetric, a control module can be added to balance the final crosstalk amount for the left and right eyes.

For another example, when a viewer is located on one side of the display device (such as, to the right or left of the center of the display device), an angle exists between the ray emitted by each display unit passing through the lens grating or the slit grating into the left eye and the right eye. The angle will affect the lens grating or the slit grating during the process so that the crosstalk amount received by the left eye and the right eye will be amplified differently (in general, for viewers on the left, the left eye is more slanted and more crosstalk; and for the viewers on the right, the right eye is more slanted and more crosstalk). The control module can adjust the crosstalk imbalance based on the spatial location of the left eye and right eye of the viewer.

For yet another example, the control module can balance the crosstalk imbalance caused by tracking errors. If a viewer is on the left or right side of the display, the tracking error is greater than when a viewer is at the center (in general, the error is higher when the deviation from the center is larger), the control module can be used adjust the error.

Therefore, the final computation model can be obtained:

$$A=\text{left-eye crosstalk total amount}+\text{right-eye crosstalk total amount}+\text{control module} \quad (1)$$

2. Parameter Definition:

For convenience of description, the left-eye image and the right-eye image can be resized to the resolution of the display device. Select a display unit on the display device, such as a sub-pixel. Assume that the display value (or information value) of the left-eye image is L, and the display value of the right-eye image is R, the final actual display value of the display unit is P. The crosstalk amount can be defined as the absolute value of the difference to the power of n (n is a positive real number). (It should be noted that other definition can also be used, such as, absolute value of the difference of the square. No specific restriction is imposed here.) The parameter α is used to depict the control factor on the crosstalk amount of the left eye caused by the display device (the display device 200 in FIG. 2) and spectroscopic device (the spectroscopic device 100 in FIG. 2), and the parameter β is used to depict the control factor on the crosstalk amount of the right eye caused by the display device and spectroscopic device. The parameters α and β are used to correspond to the weight of the left-eye crosstalk total amount and the right-eye crosstalk total amount in the final crosstalk total amount A. The control module can directly use the difference between the left-eye crosstalk total amount and the right-eye crosstalk total amount. Based on the above definition, the above crosstalk total amount equation (1) can be:

$$A = \alpha|P-L|^n + \beta|P-R|^n + \gamma|\alpha|P-L|^n - \beta|P-R|^n|^m \geq 0 \qquad (2)$$

As such, to eliminate or minimize the crosstalk, the most reasonable P must be found so that the equation (2) can result in a minimum crosstalk total amount A entering the left and right eyes.

Wherein γ is the weight factor of the control module, and is for increasing or decreasing the extent of the control module. When γ=0, the adjustment factor from the control module is considered eliminated. |Pt−L| is a quantization of the left-eye crosstalk amount, and the reason for perform the power to n (n being a positive real number) on the |P−L| is because in actual application the human eye is not necessarily sensing the display value change in a linear manner. Correspondingly, m (m being a positive real number) is the corresponding adjustment amount of the control module. Take RGB color space as example. The human eye does not sense the difference in brightness 20–10 as the twice of the difference in brightness 20–15. The brightness difference (or crosstalk amount difference) can be non-linear. The parameters α and β are the control coefficients of the difference between the crosstalk amounts, and the value is related to many factors, such as, tilt angle when disposing the grating, sensory difference of human eye on the display unit of different brightness color, the spatial location of the display unit, the parallax of the content of the display unit, and so on.

Solution of the Model

1. Configuring Coefficients:

The left-eye image and the right-eye image correspond to different display area ratios on the display unit. Specifically, as P1 and P2 shown in FIG. 4, S1 indicates the display area ratio corresponding to the left-eye image on the display unit, and S2 indicates the display area ratio corresponding to the right-eye image on the display unit.

Therefore, preferably, based on the display area ratios, the weight of the first crosstalk amount on the left-eye image caused by the right-eye image and the second crosstalk amount on the right-eye image caused by the left-eye image in the crosstalk total amount of the left-eye and right-eye images can be identified. Specifically, the weight can be understood as the parameters α and β in equation (2), wherein α is the weight corresponding to the left-eye crosstalk total amount and β is the weight corresponding to the right-eye crosstalk total amount.

Preferably, the display area ratio is proportional to the weight. Because the crosstalk effect is stronger when the display area ratio is higher. Therefore, by making the display area ratio proportional to the weight, the more adjustment is performed on the side with the higher weight so that the display effect of the left-eye image and the right-eye image is balanced while reducing the crosstalk effect.

For a specific embodiment, the display area ratios S1, S2 can be selected as the corresponding weights, i.e.:

$$\begin{cases} \alpha = S1 \\ \beta = S2 \end{cases}$$

wherein, S1+S2≤1, 0≤S1≤1, 0≤S2≤1; and when δ=100')/0, S1+S2=1.

2. Crosstalk Measurement

For convenience of description, the specific crosstalk measurement (such as, |P−L|$^n$ is the crosstalk amount on the left-eye image) can use the common absolute value, i.e., n=1, and the left-eye crosstalk total amount can be expressed as S1\*|P−L| and the right-eye crosstalk total amount can be expressed as S2\*|P−L|. In the mean time, when the weight factor γ of the control module is a certain value (such as a constant), it can be expressed as γ\*|S1|P−L|−S2|P−R||$^2$, where m=2 is a specific adjustment amount. At this point, the equation (2) can be expressed as:

$$A = S1|P-L| + S2|P-R| + \gamma|S1|P-L| - S2|P-R||^2 \geq 0 \qquad (3)$$

The calculation equation (3) can be understood as the equation to compute the crosstalk total amount based on the display value of the left-eye image and the display value of the right-eye image related to the display value on the display unit, so as to optimize the display value of the display unit when minimizing the equation in real number domain.

For calculating the optimized display value, the display area ratios must also be computed so that unknown variable in the equation (3) includes only the display value P.

3. Display Area Ratios:

There are various ways to solve the display area ratios, (S1, S2 in FIG. 4). For example, a specific manner includes the computation of the area based on the coordinates of each point.

(1) Based on Triangle, Trapezoid Area Formula:

The display area ratio shows the following equations:

$$\begin{cases} \alpha = S1 = \alpha \quad (\theta, \delta, pos, \text{pitch}, xoff) \\ \beta = S1 = \beta \quad (\theta, \delta, pos, \text{pitch}, xoff) \end{cases}$$

wherein, referring to FIG. 2, θ is the tilt angle between the display panel 200 and the spectroscopic device 100 when disposed in tilt manner, δ is aperture ratio, pos is the spatial location of current display unit on the display panel 200, pitch is the horizontal period of the arrangement on the display panel 200 along the horizontal direction, xoff is the horizontal misalignment (offset) between the display panel 200 and spectroscopic device 100. Combing the above parameters in FIG. 2, the formula for calculating triangular trapezoid area can be used to obtain S1 and S2.

Of course, as a preferred embodiment, 3D display scene based on eyeball tracking is also possible. In the scene, the pitch and xoff can both change according to the viewer's location.

Figure 5:
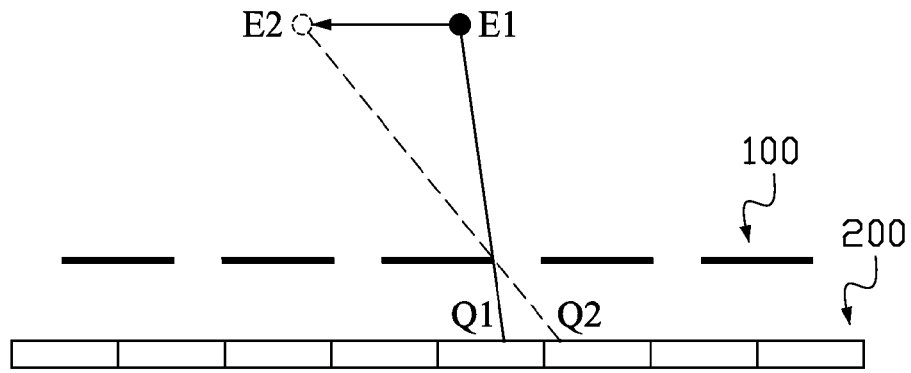
FIG. 5 is a schematic view showing adjusting the image arrangement order when a viewer's position moving horizontally according to an embodiment of the present invention.

1) Horizontal Change:

FIG. 5 is a schematic view showing adjusting the image arrangement order when a viewer's position moving horizontally according to an embodiment of the present invention.

As shown in FIG. 5, assume that the initial location of the viewer is E1. Schematically, the pixel image at Q1 on the display device 200 provides a 3D display image to the viewer through spectroscopic device 100.

When the viewer moves, such as from E1 to E2, correspondingly, the arrangement information on the display device 200 must move the distance from Q1 to Q2 in the opposite direction of from E1 to E2 so that the pixel image at Q1 is moved to Q2 to ensure that the viewer will view the correct 3D display content.

Figure 6:
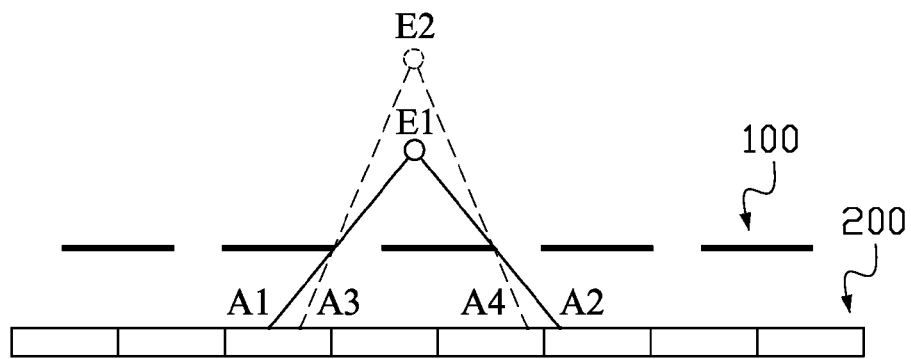
FIG. 6 is a schematic view showing adjusting the image arrangement period when a viewer's position moving vertically according to an embodiment of the present invention.

2) Vertical Change:

FIG. 6 is a schematic view showing adjusting the image arrangement period when a viewer's position moving vertically according to an embodiment of the present invention.

As shown in FIG. 6, assume that the initial location of the viewer is E1. Schematically, the arrangement period (pitch) of the pixel image on the display device 200 provides a 3D display image to the viewer through spectroscopic device 100.

When the viewer moves, such as from E1 to E2, correspondingly, the arrangement period (pitch) on the display device 200 must be adjusted from the length of A1 to A2 to A3 to A4 so that the pixel image at A1 is moved to A3 to ensure that the viewer will view the correct 3D display content.

3) Function Fitting:

For the information of spatial location pos on the display unit, a function fitting manner can be used to approximate to obtain a function of S1, S2 of pos. Referring to FIG. 2, because the spectroscopic device 100 is periodic, the left and right image areas of the display device 200 is also periodic. Therefore, the entity is periodic and the changes of S1, S2 according to pos must also be periodic. Hence, a periodic fitting function can be used to approximate the S1, S2 of pos.

Through function fitting, the actual function of S1, S2 of pos can be obtained so as to effectively reduce the computation load of S1, S2. Also, the obtained values for S1, S2 can be smoother and result in better crosstalk reduction.

(3) Numeric Integral:

For another specific embodiment, a numeric integral manner can be used to compute S1, S2. Compared to (1), the computation is more accurate and able to reduce the computation complexity. Also, when the increment is small in integral, a very high accuracy can be achieved.

4. Solve the Minimum Crosstalk Total Amount:

Embodiment 1

No Control Module is Considered

When no control module is considered, i.e., the corresponding weight factor γ=0, and equation (3) becomes:

$$A=S1*|P-L|+S2*|P-R|\geq 0 \quad (4)$$

For convenience of description, the following discussion is based on the values of L and R.

(1) L≤R

Because the display value P in final display must be between L and R, i.e., L≤P≤R, the equation (4) can be simplified as:

$$A=(S1-S2)*P-(S1*L-S2*R)\geq 0$$

When A is minimized (i.e., A=0), under the condition of S1−S2≠0:

$$P=\frac{S1*L-S2*R}{S1-S2}=\overline{P}$$

Figure 7:
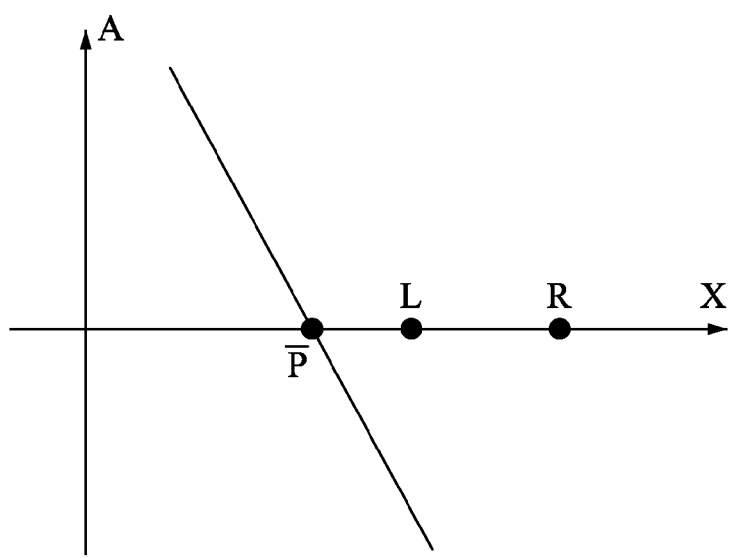
FIG. 7 is a schematic view showing a function image of the total crosstalk amount according to an embodiment of the present invention.

If $\overline{P}$<L, S1−S2>0. Proof: as shown in FIG. 7, if S1−S2<0, the function of the crosstalk total amount A is monotonically decreasing according to P. Therefore, when P[L, R], FIG. 7 shows A<0, which contradicts the A≥0 defined in equation (4). Therefore, only S1−S2>0 is possible. That is, the function of the crosstalk total amount A is monotonically decreasing according to P. Therefore, when the computed $\overline{P}$ is less than L, the P=L can be chosen to minimize A in a reasonable condition.

Similarly, if $\overline{P}$>R, there must exist S1−S2<0. Based on monotonic regularity, when P=R, A is minimum in a reasonable condition.

Therefore, in summary, $$P = \begin{cases} P = \overline{P}, & \text{if } L \leq \overline{P} \leq R \\ P = L, & \text{if } \overline{P} < L \\ P = R, & \text{if } \overline{P} > R \end{cases}$$

Or, simplified as:

$$P=\max\{L,\min(R,\overline{P})\}$$

(2) L>R

Similar to the analysis in (1):

$$P = \begin{cases} P = \overline{P}, & \text{if } R \leq \overline{P} \leq L \\ P = L, & \text{if } \overline{P} > L \\ P = R, & \text{if } \overline{P} < R \end{cases}$$

Or, simplified as:

$$P=\max\{R,\min(L,\overline{P})\}$$

Of course, in summary of (1) and (2), and combining the above result:

$$P = \begin{cases} P = \overline{P}, & \text{if } A \leq \overline{P} \leq B \\ P = A, & \text{if } \overline{P} < A \\ P = B, & \text{if } \overline{P} > B \end{cases}$$

Or, simplified as:

$$P=\max\{A,\min(B,\overline{P})\}$$

Wherein A is the smaller of the left-eye crosstalk total amount L and right-eye crosstalk total amount R, and B is the larger of the two.

In the mean time, when S1−S2=0, i.e., the display area ratio of the left-eye image and the right-eye image on the display unit (can be a sub-pixel) is the same, P can be selected as P=0.5*(L+R) to balance the left eye and right eye, or other values as long as the condition S1−S2≠0 always stands in computation process.

Embodiment 2

When Control Module is Considered

Preferably, based on the difference between the first crosstalk amount and the second crosstalk amount, the calculation equation of crosstalk total amount can be adjusted to balance the first crosstalk amount and the second crosstalk amount; and based on the adjusted crosstalk total amount, the optimized display value is computed.

Wherein the control module can correspond to the difference between the first crosstalk amount and the second crosstalk amount. By adding a balance control parameter for the difference between the first crosstalk amount and the second crosstalk amount to the calculation equation of the interference value, and through controlling the weight of the balance control parameter, the extent of effect of the control module on the crosstalk total amount can be adjusted.

Through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

Specifically, when a control module is considered, i.e., the corresponding weight factor $\gamma \neq 0$, and equation (3) can be computed directly.

For convenience of description, the following discussion is based on the values of L and R.

(1) L≤R

Because the display value P in final display must be between L and R, i.e., L≤P≤R, the equation (3) can be simplified as:

$$A = S1(P-L) + S2(R-P) + \gamma(S1(P-L) - S2(R-P))^2 \quad (5)$$

Or, expanded as:

$$A = \gamma(S1+S2)^2 P^2 + [(S1-S2) - 2\gamma(S1+S2)(S1L+S2R)]P + (S2R-S1L) + \gamma(S1L+S2R)^2 \quad (6)$$

Based on actual physical definition, $\gamma$ is the weight factor of the control module, therefore, $\gamma > 0$. When the actual shielding length of the grating is less than the width of a display unit, $S1+S2>0$. Therefore, the A in the equation (6) is a 2-order polynomial of P, and opening upwards. Base on Veite Theorem, corresponding to the minimum of A, P is selected as:

$$P = -\frac{(S1-S2) - 2\gamma(S1+S2)(S1L+S2R)}{2\gamma(S1+S2)^2} = \overline{P}$$

In the mean time, considering L≤P≤R, for the condition that $\overline{P}$ falls outside of range [L, R], combined with the above selection, the following is known:

$$P = \begin{cases} P = \overline{P}, & \text{if } L \leq \overline{P} \leq R \\ P = L, & \text{if } \overline{P} < L \\ P = R, & \text{if } \overline{P} > R \end{cases}$$

Or, simplified as:

$$P = \max\{L, \min(R, \overline{P})\}$$

(2) L>R

Similar to the analysis in (1), L>P>R, the equation (3) can be simplified as:

$$A = \gamma(S1+S2)^2 P^2 + [(S1-S2) - 2\gamma(S1+S2)(S1L+S2R)]P + (S1L-S2R) + \gamma(S1L+S2R)^2 \quad (7)$$

Based on actual physical definition, $\gamma$ is the weight factor of the control module, therefore, $\gamma > 0$. When the actual shielding length of the grating is less than the width of a display unit, $S1+S2>0$. Therefore, the A in the equation (7) is a 2-order polynomial of P, and opening upwards. Base on Veite Theorem, corresponding to the minimum of A, P is selected as:

$$P = -\frac{(S1-S2) - 2\gamma(S1+S2)(S1L+S2R)}{2\gamma(S1+S2)^2} = \overline{P}$$

In the mean time, considering R≤P≤L, for the condition that $\overline{P}$ falls outside of range [R, L], combined with the above selection, the following is known:

$$P = \begin{cases} P = \overline{P}, & \text{if } R \leq \overline{P} \leq L \\ P = R, & \text{if } \overline{P} < R \\ P = L, & \text{if } \overline{P} > L \end{cases}$$

Or, simplified as:

$$P = \max\{L, \min(L, \overline{P})\}$$

Of course, in summary of (1) and (2), and combining the above result:

$$P = \begin{cases} P = \overline{P}, & \text{if } A \leq \overline{P} \leq B \\ P = A, & \text{if } \overline{P} < A \\ P = B, & \text{if } \overline{P} > B \end{cases}$$

Or, simplified as:

$$P = \max\{A, \min(B, \overline{P})\}$$

Wherein A is the smaller of the left-eye crosstalk total amount L and right-eye crosstalk total amount R, and B is the larger of the two.

Based on the above 3D display method, the present invention also provides a corresponding 3D display device. Specifically, FIG. 8 is a schematic view of the 3D display device according to an embodiment of the present invention.

Figure 8:
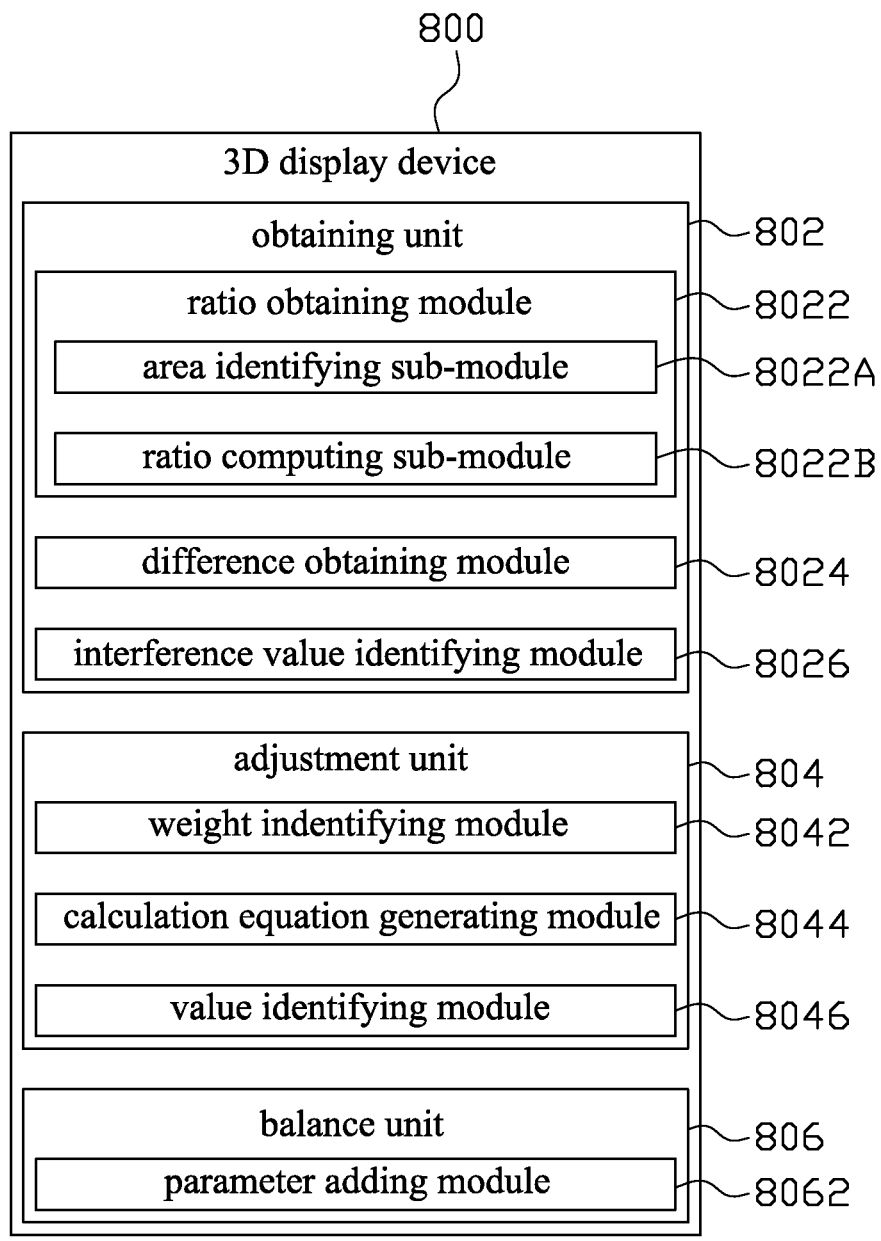
FIG. 8 is a schematic view of the 3D display device according to an embodiment of the present invention.

As shown in FIG. 8, a 3D display device 800 comprises: an obtaining unit 802, for obtaining an interference value of a display unit displaying at least one pair of images with parallax under the coverage of a spectroscopic device; an adjustment unit 804, for adjusting the display unit based on the interference value; and a display unit, after adjustment for displaying the at least one pair of images with parallax and obtain the display area ratios on the same display unit corresponding to the left-eye image and right-eye image; a calculating unit 804, for calculating the optimized display value of the pixel image of the same display unit based on the display area ratios; a display unit 806, for displaying the optimized display value for the pixel image.

In the instant technical solution, the interference value comprises the total amount of crosstalk generated mutual by the at least one pair of images with parallax. By adjusting the display unit based on the interference value, the adjusted display unit can reduce the interference value, that is, reduce the corresponding total amount of crosstalk generated mutual by the at least one pair of images with parallax, so as to optimize the 3D display effect.

In addition, according to a preferred embodiment of the present invention, the 3D display device 800 further comprises the following technical feature:

According to a preferred embodiment of the present invention, the obtaining unit 802 further comprises: a ratio obtaining module 8022, for obtaining the display area ratios corresponding to for the at least one pair of images with parallax displaying on the display unit; a difference obtaining module 8024, for obtaining the respective differences between display values of the display unit and display values of the at least one pair of images with parallax; an interference value identifying module 8026, for obtaining the interference value based on the display area ratios corresponding to the at least one pair of images with parallax displaying on the display unit, and respective differences between display values of the display unit and display values of the at least one pair of images with parallax.

In the instant technical solution, since the display area ratios is related to the affected extent, such as, a more strongly affected extent for a larger display area ratio, a corresponding affected extent can be identified by obtaining the display area ratio so as to adjust the display unit based on the affected extent to display the optimized display values when displaying pixel images. In other words, the interference value from the left-eye image and the right-eye image is reduced to decrease the crosstalk effect.

Through obtaining simultaneously the display area ratio corresponding to the left-eye image and right-eye image, the effect on the left-eye image and right-eye image can be understood; and when adjusting the optimized display values based on the effect, the left-eye image and right-eye image can both be considered to avoid adjusting the left-eye image and right-eye image inconsistently, which may result in an inconsistent viewing for both eyes.

In the mean time, because the display unit can only display certain fixed values, therefore, the interference value identified through the respective difference between the display values of the display unit and the left-eye image and right-eye image can both consider the effect of the actual display values of the display unit on the left-eye image and the right-eye image so as to make the final display effect more reasonable and balanced.

According to a preferred embodiment of the present invention, the ratio obtaining module 8022 comprises: an area identifying sub-module 8022A, for identifying display area on the display unit corresponding to the at least one pair of images with parallax respectively based on a structural attribute of the 3D display device 800 of the display unit and/or location information of a viewer; and a ratio calculating sub-module 8022B, for calculating the respective ratio between the display area on the display unit corresponding to the at least one pair of images with parallax and the total display area.

In the instant technical solution, the structure attribute is fixed after the 3D display device 800 is manufactured. Therefore, the display area ratios can be known according to the actual structure feature of the 3D display device 800. Also, when eyeball tracking technique is used in display technology, the different location information of a viewer can also lead to changes in the display area of the display unit corresponding to the left-eye image and the right-eye image. Therefore, obtaining the location information can also be used to reduce the crosstalk level when using eyeball tracking.

Wherein, without considering eyeball tracking, the ratio between the display area and corresponding display area can be computed solely based on the structure attribute of the 3D display device 800. Similarly, when all the parameters of the structure features are fixed, the ratio between the display area and corresponding display area can be computed solely based on the location information of eyeball tracking. Through simultaneously obtaining the structure attribute and location information, both hardware features and eyeball tracking technique can be considered to realize the reduction of crosstalk.

Preferably, the structure attribute comprises at least one or any combination of the following: a tilt angle between the display panel of the 3D display device 800 and the spectroscopic device, an aperture ratio of the spectroscopic device, location information of the display unit at the spectroscopic device, a parallax of the display content of the display unit and the size of the display unit.

In the instant technical solution, if the spectroscopic device and the display panel are not disposed with an in-between tilt angle, the tilt angle can be considered as 0°. However, a non-zero tilt angle must be considered when the disposition between the spectroscopic device and the display panel is in a tilt manner and an error may exist. Also, when lens grating is used, the lens grating may be considered as equivalent to a slit grating with an aperture ratio of 100%.

Of course, for those with ordinary skill in this field, any one or more items from the above structure attribute can be used, as well as, other structure attributed not mentioned above. When more types of structure attributes are used, a more accurate computation can be resulted. On the other hand, when less attributes are used, the computation load is reduced.

According to a preferred embodiment of the present invention, the adjustment unit 804 comprises: a weight identifying module 8042, for the at least one pair of images with parallax, identifying a first weight of a first crosstalk amount in the left-eye image caused by the right-eye image on the left-eye image, and a second weight of a second crosstalk amount in the right-eye image caused by the left-eye image on the right-eye image; a calculation equation generating module 8044, for, based on the first weight, the second weight, the display value of the left-eye image and the display value of the right-eye image, generating a calculation equation of the interference value regarding the display value of the display unit; a value identifying module 8046, when the calculation equation having a minimum interference value and the optimized display value of the display unit being between the display value of the left-eye image and the display value of the right-eye image, for obtaining the optimized display value of the display unit.

In the instant technical solution, when generating the calculation equation of the interference value, the use of weight embodies the effects on the left-eye image and the right-eye image. Therefore, when the optimized display value is computed based on the equation, the adjustment on the crosstalk amount on the left-eye image and the right-eye image can be reflected, i.e., reducing crosstalk effect.

Preferably, the display area ratio corresponding to the left-eye image is proportional to the first weight and the display area ratio corresponding to the right-eye image is proportional to the second weight. In the instant technical solution, the crosstalk effect is stronger when the display area ratio is higher. Therefore, by making the display area ratio proportional to the weight, the more adjustment is performed on the side with the higher weight so that the display effect of the left-eye image and the right-eye image is balanced while reducing the crosstalk effect.

Specifically, the weight indentifying module 8042 of an embodiment could use the display area ratio corresponding to the left-eye image as the first weight, and the display area ratio corresponding to the right-eye image as the second weight.

In the instant technical solution, the display area ratio can be directly used as a corresponding weight. Alternatively, other parameters proportional to the display area ratios can also be used realize the crosstalk adjustment on the left-eye and right-eye images.

According to a preferred embodiment of the present invention, the device further comprises: a balance unit 806, based on the difference between the first crosstalk amount and the second crosstalk amount, for adjusting the calculational equation of the interference value to balance the first crosstalk amount and the second crosstalk amount; wherein the value identifying module 8046 obtains the optimized display value of the display unit based on the adjusted calculation equation of the interference value.

In the instant technical solution, not only the interference value must be minimized, the difference between the first crosstalk amount and the second crosstalk amount is also considered through the adjustment on the calculation equation of the interference value so that the respective crosstalk amount corresponding to left-eye image and the right-eye image is more balanced and reasonable when displaying with the adjusted display values, which makes the left-eye image and the right-eye image more coordinated to improve viewing experience.

Preferably, the balance unit 806 comprises: a parameter adding module 8062, for adding a balance control parameter for the difference between the first crosstalk amount and the second crosstalk amount to the calculation equation of the interference value.

In the instant technical solution, through adding the balance control parameter, the consideration of the difference between the first crosstalk amount and the second crosstalk amount is taken into account so as to balance the respective crosstalk amount corresponding to the left-eye image and right-eye image, which makes the left-eye image and the right-eye image more coordinated to improve viewing experience.

Through the above technical solutions, the crosstalk effect in the 3D displaying process can be effectively reduced to improve 3D displaying result.

The above uses drawings and embodiments to describe the technical solution of the present invention. Based on the display area ratio on the display unit corresponding to the left-eye and right-eye images respectively, the present invention can perform controlling weights of the left-eye and right-eye crosstalk total amounts to reduce the crosstalk total amount. It should be understood that other means can also be applied to realize the controlling of the weights of the left-eye and right-eye crosstalk total amounts to reduce the crosstalk total amount. As a more specific embodiment, the following uses human eye visual experience as example to describe the technical solution to control the weights.

1. Visual Experience Rule

In the instant embodiment, the equation (1) can still be used as a computation model, i.e., $$A=\text{left-eye crosstalk total amount}+\text{right-eye crosstalk total amount}+\text{control module} \quad (1)$$

In the instant embodiment, for the convenience of description, the control module is temporarily omitted, i.e., the equation (1) is simplified as:

$$A=\text{left-eye crosstalk total amount}+\text{right-eye crosstalk total amount} \quad (8)$$

Assume that the display value (or information value) of the left-eye image is L, and the display value of the right-eye image is R, the final actual display value of the display unit is P. The equation (8) can be specifically expressed as:

$$A=\alpha|P-L|^n+\beta|P-R|^n\geq 0 \quad (9)$$

Wherein the parameter $\alpha$ is used to depict the control factor on the crosstalk amount of the left eye caused by the display device (the display device 200 in FIG. 2) and spectroscopic device (the spectroscopic device 100 in FIG. 2), and the parameter $\beta$ is used to depict the control factor on the crosstalk amount of the right eye caused by the display device and spectroscopic device. The parameters $\alpha$ and $\beta$ are used to correspond to the weight of the left-eye crosstalk total amount and the right-eye crosstalk total amount in the final crosstalk total amount A.

For the convenience of description, the following uses $L \leq R$ as example to explain the human eye visual experience rule.

(1) Bright Crosstalk and Dark Crosstalk

When L and R have different display values, for human eye, the crosstalk on R caused by L (i.e., the left-eye image on the right-eye image) is different from the crosstalk on L caused by R (i.e., the right-eye image on the left-eye image).

Assume that the display unit P1 (shown in FIG. 2) has a display value P=L, there exists no crosstalk for the left-eye image. However, because $P \geq L$, the actual display value is higher than the ideal display value for the left-eye image, which is called bright crosstalk.

On the other hand, if the display unit P1 has a display value P=R, there exists no crosstalk for the right-eye image. However, because $P \leq L$, the actual display value is lower than the ideal display value for the right-eye image, which is called dark crosstalk.

When the difference extent is the same, i.e., P−L=R−P, the bright crosstalk and the dark crosstalk make very different viewing experience for the viewer. The human eye is more sensitive to the bright crosstalk. For brightness, the human eye is more sensitive to a pixel with higher brightness on a white image than a pixel with lower brightness on a white image.

Specifically, take RGB color space as example. Assume that the display shows an image of RGB=(200, 200, 200). When point A has a corresponding $RGB_{(A)}$=(150, 150, 150), point B has a corresponding $RGB_{(B)}$=(250, 250, 250), and both A and B are located at the positions with similar prominence, the human eye is more easily to detect point B, i.e., more sensitive to bright crosstalk.

Therefore, when L<R, the crosstalk to the left-eye image is the bright crosstalk, and a higher value should be selected for weight factor $\alpha$ corresponding to the left-eye image than the value of as a penalty for the fact that a bright crosstalk is more sensitive to the human eye; while the crosstalk to the right-eye image is the dark crosstalk, and a higher value should be selected for weight factor $\beta$ corresponding to the right-eye image than the value of $\alpha$, as a reward for the fact that a dark crosstalk is less sensitive to the human eye.

If Tol1 depicts the tolerance coefficient of the left eye regarding the bright crosstalk or dark crosstalk, and Tol2 depicts the tolerance coefficient of the right eye regarding the bright crosstalk or dark crosstalk, to correspond to the value selection rule for $\alpha$ and $\beta$, the value selected for Tol1 should be relatively bigger than the value selected for Tol2.

(2) Changes in Experience when Difference of Display Value is the Same

Assume that the display area ratios S1 and S2 in the embodiment of FIG. 4 are the same, and further assume that the brightness values (using brightness as example, and other display values may also be used) of the left-eye and right-eye images at P1 are L1=0 and R1=20, respectively; and the brightness values of the left-eye and right-eye images at P2 are L2=200 and R2=220. According to the above display area ratios (specifically, because S1=S2, the brightness value can be the average of the brightness values of the left-eye and right-eye images): the brightness value at P1 is p1=10, and the brightness value at P2 is p2=210.

Based on actual experience, the left eye experiences the bright crosstalk and the crosstalk extent at P1 is higher than P2; therefore, the tolerance coefficient Tol1 for the left eye should have a higher value at P1 than P2 as a penalty for the bright surrounding at P1.

In fact, the final display brightness value at P1 is the infinite times of the brightness value L1 of the left-eye image, and the final display brightness value at P2 is roughly the same as the brightness value L2 of the left-eye image (without obvious difference) so that the bright crosstalk at P1 is more sensitive to the bright crosstalk at P2. The rule for the left eye experience can be summarized as follows:

When the difference of brightness R−L for the left-eye and right-eye images is fixed, the bright crosstalk experienced by left eye is monotonically related to the values of the left-eye and right-eye images in the entire brightness range. For the convenience of description, the values of the left-eye and right-eye images in the entire brightness range are simplified as the average brightness of the left-eye and right-eye images 0.5*(L+R). At this point, the value selected for Tol1 is monotonically decreasing with the average brightness of the left-eye and right-eye images 0.5*(L+R).

Similarly, because the right eye experiences dark crosstalk and the crosstalk extent at P1 is smaller than P2, the tolerance coefficient Tol2 for the right eye should have a lower value at P1 than P2 as a reward for the bright surrounding at P1. At this point, the value selected for Tol2 is monotonically increasing with the average brightness of the left-eye and right-eye images 0.5*(L+R).

(3) Changes in Experience when Sum of Display Value is the Same

For another rule, the brightness of the left-eye and right-eye images and (L+R) are fixed and S1=S2 is used as example. Assume that the specific brightness at P1 is L1=40, R1=60, and the specific brightness at P2 is L2=10, R2=90. Because L1+R1=L2+R2, the actual display values at P1 and P2 are P1=P2=50 based on the area ratio.

Based on the actual experience, the left eye still experiences bright crosstalk and the crosstalk extent at P1 is less than P2; and the right eye still experiences dark crosstalk and the crosstalk extent at P1 is higher than P2. Therefore, the value selected for Tol1 is monotonically increasing with respect to the brightness difference R−L of the left-eye and right-eye images, and the value selected for Tol2 is monotonically decreasing with respect to the brightness difference R−L of the left-eye and right-eye images.

2. Examples for Quantization of Tol1 and Tol2

Based on the above description of human eye experience rules, when L≤R, the values selected for Tol1 and Tol2 can be based on the monotonic dynamics of the human eye experiencing bright crosstalk and dark crosstalk in an environment of different brightness. Specifically, (it should be understood that other means, such as square or functions can also be used to express the monotone):

$$\begin{cases} Tol1 = atol + btol * \dfrac{R-L}{L+R+\varepsilon} \\ Tol2 = atol - btol * \dfrac{R-L}{L+R+\varepsilon} \end{cases}$$

Wherein atol>0, btol>0 are adjustment coefficients, $\varepsilon$ is a very small positive value for avoiding the denominator becoming 0. Because Tol1 and Tol2 are the crosstalk tolerance ratio (i.e., relative value) for left eye and right eye, and mutually restraining to each other, the following can be imposed: Tol1+Tol2=1, Tol1≥0, Tol2≥0, and the above equation can be expressed as:

$$\begin{cases} Tol1 = 0.5 + 0.5 * \dfrac{R-L}{L+R+\varepsilon} \\ Tol2 = 0.5 - 0.5 * \dfrac{R-L}{L+R+\varepsilon} \end{cases}$$

3. Combination of Crosstalk Tolerance Coefficients and Display Area Ratio

Considering the relevance of the crosstalk tolerance coefficients and display area ratio, Tol1 and Tol2 for human eye experience can be combined with the display area ratio S1, S2 of FIG. 4 to solve the parameters $\alpha$ and $\beta$.

There are several specific approaches to find solution, such as, by adding or multiplying both. Take multiplication as example, the following is obtained:

$$\begin{cases} \alpha = Tol1 * S1 \\ \beta = Tol2 * S2 \end{cases}$$

By performing normalization computation on $\alpha$ and $\beta$, the result is as follows:

$$\begin{cases} \alpha = \alpha(Tol1, S1) = \dfrac{Tol1 * S1}{Tol1 * S1 + Tol2 * S2 + \varepsilon} \\ \beta = \beta(Tol2, S2) = \dfrac{Tol2 * S2}{Tol1 * S1 + Tol2 * S2 + \varepsilon} \end{cases}$$

4. Find Optimized Display Value
(1) n=1
At this point, equation (9) can be expressed as:

$$A = \alpha|P-L| + \beta|P-R| \geq 0 \quad (10)$$

Similar to the embodiment using only area ratio in computation, when A is minimized, i.e., A=0 and $\alpha - \beta \neq 0$, the following is known:

$$P = \dfrac{\alpha L - \beta R}{\alpha - \beta} = \tilde{P}$$

When L≤R, the conclusion is:

$$P = \max\{L, \min[R, \tilde{P}]\}$$

When L>R, the conclusion is:

$$P = \max\{R, \min[L, \tilde{P}]\}$$

When $\alpha - \beta = 0$, i.e., the weights for left-eye crosstalk total amount and the right-eye crosstalk total amount are the same, P=0.5*(L+R), or using other means to ensure that $\alpha - \beta$ can approaches 0 infinitely during the computation, but not becoming 0.

(2) n≠1
At this point, n>0 and n≠1, n is a positive real number. The values selected for A in equation (9) is a smooth curve function with respect to P, and based on the actual reasonable physic meaning, a minimum exists for A(P) in real number domain (P>0), and only extreme value (the remaining extremes are complex and without physical meaning). The following discusses finding solution.

1) L≤R

Based on actual physic meaning, P[L, R], and equation (9) can be expressed as:

$$A=\alpha(P-L)^n+\beta(R-P)^n \geq 0 \quad (11)$$

Find the derivation of A with respect to P, and find the zero point of the derivation, the following is obtained:

$$\frac{dA}{dP} = \alpha n(P-L)^{n-1} - \beta n(R-P)^{n-1} = 0$$

In real number domain, equation (11) has on only solution and the solution is:

$$P = \frac{\alpha^{n-1}*L + \beta^{n-1}*R}{\alpha^{n-1} + \beta^{n-1}} = \tilde{P} \quad (12)$$

Because α+β=1, obviously:

$$L \leq \tilde{P} = \frac{\alpha^{n-1}*L + \beta^{n-1}*R}{\alpha^{n-1} + \beta^{n-1}} \leq R$$

2) L>R

The analysis process is similar to 1), and the value selected for the optimized P is consistent with the computation result of equation (12) in 1), and $\tilde{P}$ is between R and L.

In summary, the actual final value P selected for the sub-pixel can be computed directly from equation (12) and the value is between L and R, wherein the specific computation involves root computation, the value with physic meaning is selected. For example, $\alpha^{n-1}$, when n=1.5, a positive real number solution is selected for the root operation of α.

Based on the above description, when n has different value, the corresponding display value P can be computed, such as:

When $n = 2$, $P = \frac{\alpha*L + \beta*R}{\alpha + \beta} = \alpha*L + \beta*R$;

When $n = 3$, $P = \frac{\alpha^2*L + \beta^2*R}{\alpha^2 + \beta^2}$;

When $n = 4$, $P = \frac{\alpha^3*L + \beta^3*R}{\alpha^3 + \beta^3}$;

When $n = 0.5$, $P = \frac{\alpha^{-0.5}*L + \beta^{-0.5}*R}{\alpha^{-0.5} + \beta^{-0.5}}$;

When $n = 1.5$, $P = \frac{\sqrt{\alpha}*L + \sqrt{\beta}*R}{\sqrt{\alpha} + \sqrt{\beta}}$;

When $n = 2.3$, $P = \frac{\alpha^{1.3}*L + \beta^{1.3}*R}{\alpha^{1.3} + \beta^{1.3}}$, and so on.

When designing different 3D display panel, n can be selected to ensure the optimized display result as the final parameter.

The above refers drawings and embodiments to describe the technical solution of the present invention. The crosstalk can severely affect the viewing experience. Therefore, the present invention provides a 3D display method and a 3D display device to effectively relieve the crosstalk phenomenon in 3D displaying process to optimize the 3D display result.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A three-dimensional (3D) display method of 3D display device, which comprises:
   obtaining an interference value of a display unit displaying at least one pair of images with parallax under the coverage of a spectroscopic device;
   adjusting the display unit based on the interference value; and
   the adjusted display unit displaying the at least one pair of images with parallax;
   wherein step of adjusting the display unit based on the interference value comprises:
   for the at least one pair of images with parallax, identifying a first weight of a first crosstalk amount in a left-eye image caused by a right-eye image on the left-eye image, and a second weight of a second crosstalk amount in the right-eye image caused by the left-eye image on the right-eye image;
   calculating the interference value based on the first weight, the second weight, the display value of the left-eye image and the display value of the right-eye image; and
   when a value of a result of the calculation is minimum and an optimized display value of the display unit is between the display value of the left-eye image and the display value of the right-eye image, the optimized display value of the display unit is obtained.

2. The 3D display method as claimed in claim 1, wherein the step of obtaining the interference value comprises:
   based on display area ratios corresponding to the at least one pair of images with parallax displaying on the display unit, and respective differences between display values of the display unit and display values of the at least one pair of images with parallax, obtaining the interference value.

3. The 3D display method as claimed in claim 2, wherein the step of obtaining the display area ratio comprises:
   based on a structural attribute of the 3D display device of the display unit and/or location information of a viewer, identifying display areas on the display units corresponding to the at least one pair of images with parallax respectively; and calculating a respective ratio between the display areas on the display unit corresponding to the at least one pair of images with parallax and a total display area.

4. The 3D display method as claimed in claim 3, wherein the structure attribute comprises:
   at least one or any combination of the following: a tilt angle between the display panel of the 3D display device and the spectroscopic device, an aperture ratio of the spectroscopic device, location information of the display unit at the spectroscopic device, parallaxes of display contents of the display unit and a size of the display unit.

5. The 3D display method as claimed in claim 1, wherein the method further comprises:
based on the difference between the first crosstalk amount and the second crosstalk amount, adjusting the result of the calculation of the interference value to balance the first crosstalk amount and the second crosstalk amount; and based on the adjusted result of the calculation of the interference value, obtaining the optimized display value of the display unit.

6. The 3D display method as claimed in claim 5, wherein the step of adjusting interference value comprises:
including a balance control parameter for the difference between the first crosstalk amount and the second crosstalk amount to the calculation of the interference value.

7. A three-dimensional (3D) display device of 3D display device, which is:
for obtaining an interference value of a display unit displaying at least one pair of images with parallax under the coverage of a spectroscopic device;
for adjusting the display unit based on the interference value; and after adjustment for displaying the at least one pair of images with parallax;
for the at least one pair of images with parallax, identifying a first weight of a first crosstalk amount in a left-eye image caused by a right-eye image on the left-eye image, and a second weight of a second crosstalk amount in the right-eye image caused by the left-eye image on the right-eye image;
based on the first weight, the second weight, the display value of the left-eye image and the display value of the right-eye image, for calculating the interference value regarding the display value of the display unit; and
when a value of a result of the calculation is minimum and an optimized display value of the display unit being between the display value of the left-eye image and the display value of the right-eye image, for obtaining the optimized display value of the display unit.

8. The 3D display device as claimed in claim 7, wherein the 3D display device is further:
for obtaining display area ratios corresponding to for the at least one pair of images with parallax displaying on the display unit;
for obtaining respective differences between display values of the display unit and display values of the at least one pair of images with parallax; and
for obtaining the interference value based on the display area ratios corresponding to the at least one pair of images with parallax displaying on the display unit, and respective differences between display values of the display unit and display values of the at least one pair of images with parallax.

9. The 3D display device as claimed in claim 8, wherein the 3D display device is further:
for identifying display areas on the display unit corresponding to the at least one pair of images with parallax respectively based on a structural attribute of the 3D display device of the display unit and/or location information of a viewer; and
for calculating a respective ratio between the display areas on the display unit corresponding to the at least one pair of images with parallax and the total display area.

10. The 3D display device as claimed in claim 9, wherein the structure attribute comprises:
at least one or any combination of the following: a tilt angle between the display panel of the 3D display device and the spectroscopic device, an aperture ratio of the spectroscopic device, location information of the display unit at the spectroscopic device, parallaxes of display contents of the display unit and a size of the display unit.

11. The 3D display device as claimed in claim 7, wherein the 3D display device is further:
based on the difference between the first crosstalk amount and the second crosstalk amount, for adjusting the result of the calculation of the interference value to balance the first crosstalk amount and the second crosstalk amount;
wherein the value identifying module obtaining the optimized display value of the display unit based on the adjusted result of the calculation of the interference value.

12. The 3D display device as claimed in claim 11, wherein the 3D display device is further:
for including a balance control parameter for the difference between the first crosstalk amount and the second crosstalk amount to the calculation of the interference value.

13. A three-dimensional (3D) display method of 3D display device, which comprises:
obtaining an interference value of a display unit displaying at least one pair of images with parallax under the coverage of a spectroscopic device;
adjusting the display unit based on the interference value; and
the adjusted display unit displaying the at least pair of images with parallax;
wherein the step of obtaining the interference value specifically comprises:
calculating display area ratios corresponding to the at least one pair of images with parallax displaying on the display unit, and
wherein the step of adjusting the display unit based on the interference value comprises:
for the at least one pair of images with parallax, identifying a first weight of a first crosstalk amount in a left-eye image caused by a right-eye image on the left-eye image, and a second weight of a second crosstalk amount in the right-eye image caused by the left-eye image on the right-eye image;
calculating the interference value based on the first weight, the second weight, the display value of the left-eye image and the display value of the right-eye image; and
when a value of a result of the calculation is minimum and an optimized display value of the display unit is between the display value of the left-eye image and the display value of the right-eye image, the optimized display value of the display unit is obtained.

14. The 3D display method as claimed in claim 13, wherein the step of calculating display are ratios corresponding to the at least one pair of images with parallax displaying on the display unit comprises:
based on a structural attribute of the 3D display device of the display unit and/or location information of a viewer, identifying display areas on the display unit corresponding to the at least one pair of images with parallax respectively; and
calculating respective ratios between the display areas on the display unit corresponding to the at least one pair of images with parallax and the total display area.

15. The 3D display method as claimed in claim 14, wherein the structure attribute comprises:
- at least one or any combination of the following: a tilt angle between the display panel of the 3D display device and the spectroscopic device, an aperture ratio of the spectroscopic device, location information of the display unit at the spectroscopic device, parallaxes of a display content of the display unit and a size of the display unit.

16. The 3D display method as claimed in claim 13, wherein the method further comprises:
- based on the difference between the first crosstalk amount and the second crosstalk amount, adjusting the result of the calculation of the interference value to balance the first crosstalk amount and the second crosstalk amount; and based on the adjusted result of the calculation of the interference value, obtaining the optimized display value of the display unit.

17. The 3D display method as claimed in claim 16, wherein the step of adjusting interference value comprises:
- including a balance control parameter for the difference between the first crosstalk amount and the second crosstalk amount to the calculation of the interference value.

* * * * *